(12) United States Patent
Lian et al.

(10) Patent No.: US 7,839,386 B2
(45) Date of Patent: Nov. 23, 2010

(54) METHOD AND APPARATUS OF SIGNAL PROCESSING AND AN INERTIAL POINT DEVICE USING THE SAME

(75) Inventors: Zhi-Wei Lian, Taipei County (TW); Chih-Kai Chiu, Tainan (TW); Shun-Nan Lou, Kaohsiung (TW); Ming-Jye Tsai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 810 days.

(21) Appl. No.: 11/756,269

(22) Filed: May 31, 2007

(65) Prior Publication Data
US 2008/0111790 A1    May 15, 2008

(30) Foreign Application Priority Data
Nov. 14, 2006    (TW) ............................. 95142009 A

(51) Int. Cl.
*G09G 5/08*    (2006.01)
*G09G 5/00*    (2006.01)
(52) U.S. Cl. ..................................... 345/158; 345/169
(58) Field of Classification Search ................. 345/163, 345/156, 164, 158, 169; 700/85; 73/649; 702/76; 463/37
See application file for complete search history.

(56) References Cited

U.S. PATENT DOCUMENTS

| 5,825,350 | A | 10/1998 | Case, Jr. et al. | |
| 6,466,831 | B1* | 10/2002 | Shibata et al. | 345/163 |
| 2004/0078159 | A1* | 4/2004 | Rober | 702/76 |
| 2005/0204820 | A1* | 9/2005 | Treiber et al. | 73/649 |
| 2006/0287087 | A1* | 12/2006 | Zalewski et al. | 463/37 |

FOREIGN PATENT DOCUMENTS

| CN | 1797292 | 7/2006 |
| JP | 9081308 | 3/1997 |
| JP | 2004121625 | 4/2004 |
| JP | 2007509448 | 4/2007 |
| TW | 519263 | 1/2003 |
| TW | I 220158 | 8/2004 |
| WO | 2005040991 | 5/2005 |

\* cited by examiner

*Primary Examiner*—Kevin M Nguyen
(74) *Attorney, Agent, or Firm*—WPAT, PC; Justin King

(57) ABSTRACT

A method of signal processing for a sensitive signal generated from a pointing device, which comprises the steps of acquiring an accelerating signal; forming a filtering signal by a first filtering process to filter the accelerating signal; and processing a second filtering process to form a processed signal. By means of the aforesaid method, an inertia pointing device is disclosed in the present invention, which is capable of processing an accelerating signal generated from the movement of the pointing device operated by the user, and transmitting the processed signal to an electrical device. The electrical device is capable of generating a corresponding displacement for moving a cursor on the display or action for controlling an object according to the processed signal.

17 Claims, 10 Drawing Sheets

| Sampling method | X-coordinate | Y-coordinate | Magnitude of variation(Noise) |
|---|---|---|---|
| Without oversampling | 2070~2083 Average : 2076 | 2015~2029 Average : 2022 | about 3.65mg at X-coordinate about 4.65mg at Y-coordinate |
| oversampling | 2077~2082 Average : 2079 | 2025~2030 Average : 2027 | about 1.99mg at X-coordinate about 1.66mg at Y-coordinate |

FIG. 8

METHOD AND APPARATUS OF SIGNAL PROCESSING AND AN INERTIAL POINT DEVICE USING THE SAME

FIELD OF THE INVENTION

The present invention relates to a signal processing method and apparatus, and more particularly, to an inertial pointing device capable of employing an oversampling operation for signal processing and thus reducing noise generated thereby.

BACKGROUND OF THE INVENTION

Currently, there are many kinds of computer mouse available on the market, which are the most popular human-machine interface used by computers as cursor-control device. There are three basic types of mice, which are mechanical mouse, LED optical mouse and laser mouse with respect to the different means of detection. A typical mechanical mouse comprises a chassis containing a ball, with a part of the ball protruding through the underside of the chassis. When an user moves the mouse about on a flat surface, the ball rotates which is detected by the sensors arranged in the chassis. Unfortunately the moving parts of such a mouse can become dirty, causing the sensors to incorrectly measure ball rotation. A typical LED optical mouse has a small, red light-emitting diode (LED) that bounces light off that surface with sufficient roughness onto a complimentary metal-oxide semiconductor (CMOS) sensor. The CMOS sensor sends each image to a digital signal processor (DSP) for analysis, that the DSP is able to detect patterns of shadows generated by the roughness of the surface in the images and see how those patterns have moved since the previous image. Based on the change in patterns over a sequence of images, the DSP determines how far the mouse has moved and sends the corresponding coordinates to the computer. However, if the working surface of the LED optical mouse is a smooth surface made of marble, tile, or metal, etc., such mouse might not be able to operate without a hitch. A laser mouse is an advanced optical mouse, which is capable of emitting a coherent light so as to detect more surface pattern variation than the standard LED based optical mice. Nevertheless, such laser mice are not able to operate fluently while working on a transparent surface made of glass, acrylic, and so on.

Since most conventional computer mice are disadvantageous as stated above, it is popular to have an inertial sensing module embedded inside a pointing device for using the inertial sensing module to detect and measure movements of the pointing device operating while sitting on a flat surface or being held in a free space. However, as an integration operation is performed by the inertial sensing module when it is being used for detecting and measuring displacement of the pointing device operating while sitting on a surface so as to control the movements of a cursor displayed on a displaying device, certain noises corresponding to the displacement will be amplified by the integration operation that causes difficulties to control and move the cursor accurately on the displaying device. There are already several researches developed or solving the noise problem. One of which is an inertial pointing device disclosed in TW Pat. No. 0519263. The foregoing inertial pointing device uses accelerometers to determine the accelerations of the inertial pointing device, and then uses an adjustable digital low-pass filter to process the signals of detected accelerations so that noises corresponding to the acceleration signals can be eliminated and the control of the cursor is improved. However, since the digital filtering performed by the low-pass filter requires a high sampling frequency, an user holding the inertial pointing device will suffer a sluggish feeling that is not felt by using an analog filtering. In addition, for storing the enormous amount of coefficients and numerical values required and generated by the digital low-pass filter, a massive memory is required so that the cost and load of the inertial pointing device are increased.

Therefore, what is needed and would be useful is a signal processing method and apparatus that can free a pointing device using the same from the aforesaid problems.

SUMMARY OF THE INVENTION

It is the primary object of the present invention to provide a signal processing method and apparatus for an inertial pointing device, capable of employing an oversampling operation for signal processing and thus reducing noise.

Another object of the invention is to provide a signal processing method and apparatus for an inertial pointing device, whose sampling frequency required and thus memory required can be reduced as an analog filtering means is adopted thereby, and thus the power consumption of the inertial pointing device is consequently reduced.

It is yet another object of the invention to provide a signal processing method and apparatus for an inertial pointing device that an analog filtering means is adopted thereby for enabling the same to be freed from the sluggish problem caused by digital filtering used by those conventional pointing device, and thus enabling the inertial pointing device to have instant response.

To achieve the above objects, the present invention provides a signal processing method, adapted for processing signals generated by a pointing device, comprising steps of: acquiring an accelerating signal from the pointing device; forming a filtering signal by filtering the accelerating signal with a first filtering process; converting the filtering signal into a digital signal; and processing the digital signal with a second filtering process to form a processed signal.

In a preferred aspect, the second filtering process further comprises steps of: oversampling the digital signal for acquiring a plurality of sampled signals; and averaging the plural sampled signals for acquiring the processed signal.

In another preferred aspect, the second filtering process further comprises steps of: oversampling the digital signal for acquiring a plurality of sampled signals; performing Fourier transform upon the plural sampled signals for forming a plurality of spectrum signals accordingly; and filtering the plural spectrum signals while converting the plural filtered spectrum signals into the processed signal by reverse Fourier transform.

Preferably, the signal process method further comprises steps of: converting the processed signal into a displacement signal; and transmitting the displacement signal to an electrical device.

Preferably, the converting of the filtering signal further comprises steps of: fetching and amplifying a specific portion of the filtering signal for forming a differential amplifying signal; and performing a digital conversion upon the differential amplifying signal for forming the digital signal.

Moreover, to achieve the above objects, the present invention further provides a signal processing apparatus, for receiving and processing an accelerating signal from an inertial sensing module, comprising: a filter, for performing a first noise filtering process upon the received accelerating signal so as to form a filtering signal; an analog-to-digital converter, coupled to the filter for enabling the same to receive and convert the filtering signal into a digital signal; and a postprocessor, coupled to the analog-to-digital converter for enabling the same to receive and perform a second noise filtering process upon the digital signal so as to form a processed signal.

In a preferred aspect, the present invention provides an inertial pointing device, comprising: an inertial sensing module, capable of sensing a motion of the inertial pointing device and thus generating at least an accelerating signal accordingly; a signal processing apparatus, coupled to the inertial sensing module; an interface module, coupled to the signal processing apparatus for enabling the same to receive and convert the processed signal into a displacement signal; and a transmission module, coupled to the interface module for enabling the same to receive and transmit the displacement signal to an electrical device; wherein the signal processing apparatus further comprises: a filter, for filtering the at least one accelerating signal so as to form a filtering signal; an analog-to-digital converter, coupled to the filter for enabling the same to receive and convert the filtering signal into a digital signal; and a post-processor, coupled to the analog-to-digital converter for enabling the same to receive and perform a noise filtering process upon the digital signal so as to form a processed signal.

Preferably, the filter is a multi-level active low-pass filter.

Preferably, the post-processor further comprises: an oversample unit, capable of oversampling the digital signal so as to form a plurality of sampled signals; and an arithmetic logic unit, capable of receiving and averaging the plural sampled signals for forming the processed signal accordingly.

In another preferred aspect, the post-processor further comprises: an oversample unit, capable of oversampling the digital signal so as to form a plurality of sampled signals; and an arithmetic logic unit, capable of receiving and Fourier-transforming the plural sampled signals for forming a plurality of spectrum signals and then filtering and converting the plural spectrum signals into the processed signal by reverse Fourier transform.

Preferably, the inertial pointing device further comprises: a differential amplifier, coupled to the filter and the analog-to-digital converter.

Preferably, the inertial pointing device further comprises at least an accelerometer, at least a gyroscope or an assembly of the aforesaid parts.

Preferably, the transmission module is a component selected from the group consisting of a wired transmission module and a wireless transmission module.

Preferably, the electrical device is a device selected from the group consisting of a game console and a computer.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 8 is a table showing the results of a signal processing method of the invention and a prior-art method.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
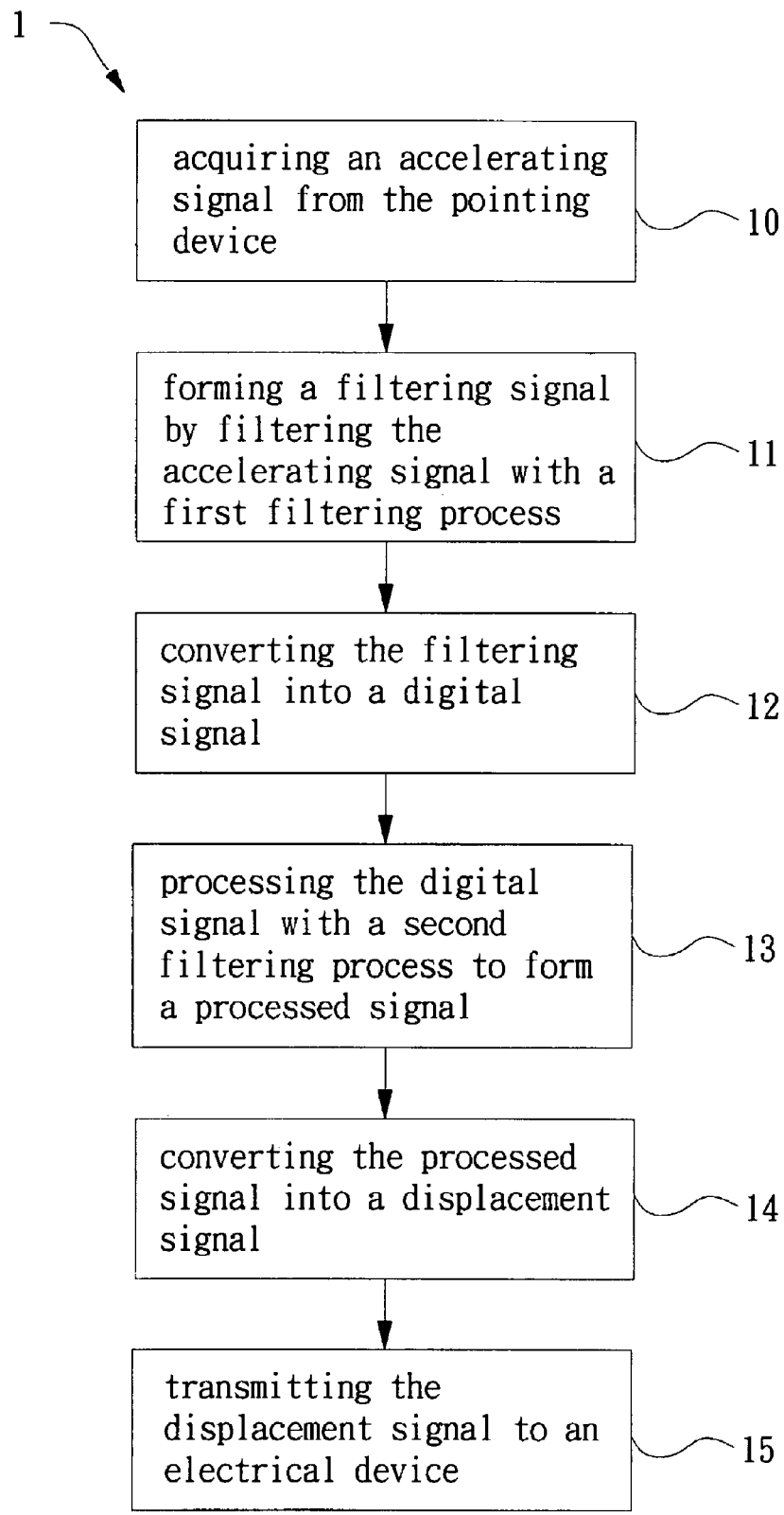
FIG. 1 is a flow chart illustrating steps of a signal processing method according to a preferred embodiment of the invention.

Please refer to FIG. 1, which is a flow chart illustrating steps of a signal processing method according to a preferred embodiment of the invention. The signal processing method is adapted for processing at least an accelerating signal generated by a pointing device and thus enabling a cursor displayed on a display of an electrical device to move accordingly. The signal processing method starts at step 10. At step 10, an accelerating signal generated from a pointing device is acquired, and then the flow proceeds to step 11. At step 11, the accelerating signal is filtered by a first filtering process of noise filtering for forming a filtering signal, and then the flow proceeds to step 12. At step 12, the filtering signal is converted and digitalized to form a digital signal, and then the flow proceeds to step 13.

Figure 2:
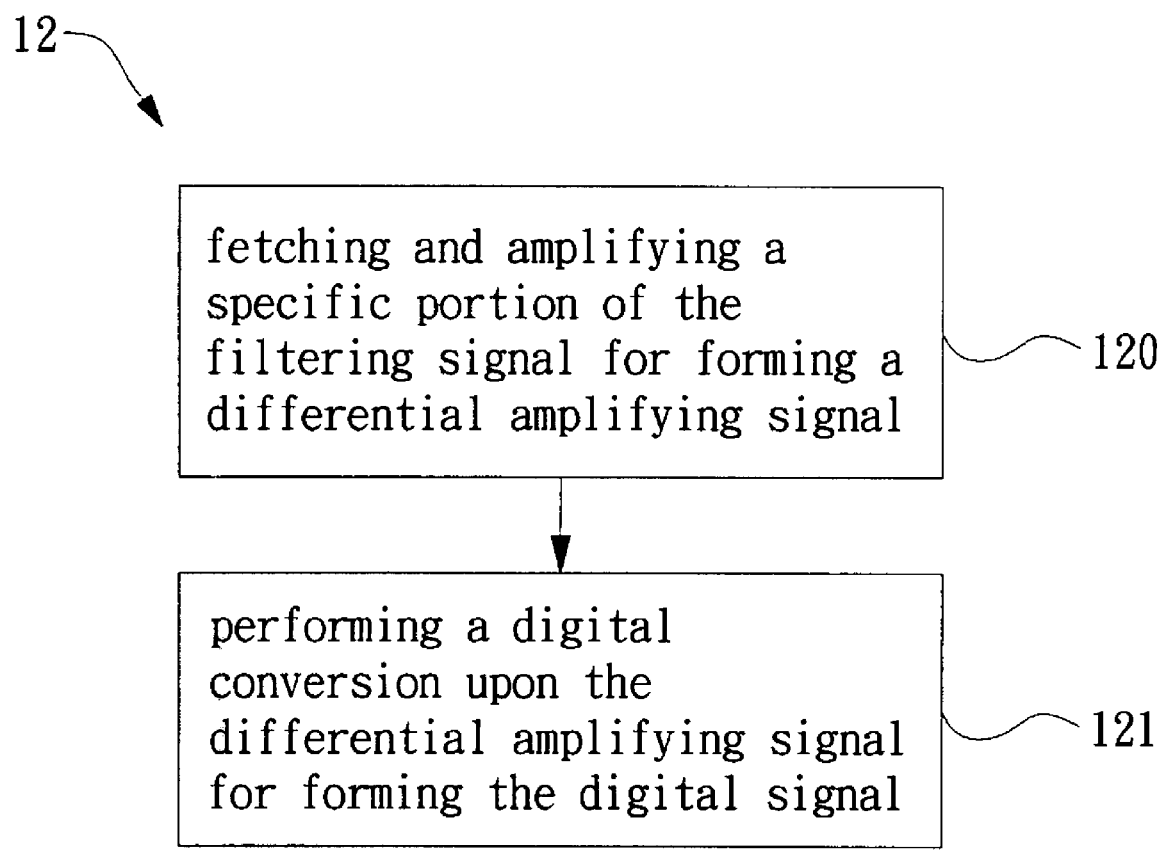
FIG. 2 is a flow chart illustrating a digital conversion steps of a signal processing method according to a preferred embodiment of the invention.

In a preferred embodiment, the conversion of the filtering signal into the digital signal is further composed of two steps, as those shown in FIG. 2A. In FIG. 2A, the conversion starts at step 120. At step 120, a specific portion of the filtering signal is fetched and amplified for forming a differential amplifying signal, and then the flow proceeds to step 121. At step 121, the differential amplifying signal is converted into the digital signal by an analog-to-digital converter.

Figure 3A:
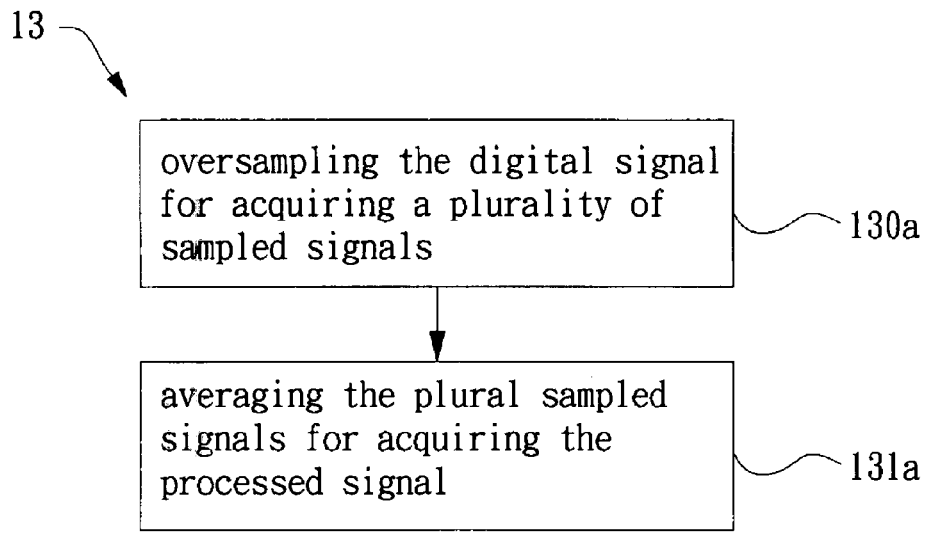
FIG. 3A is a flow chart illustrating steps of a second filtering process used in a signal processing method according to a preferred embodiment of the invention.

Back to step 13 of FIG. 1. At step 13, the digital signal is processed by a second filtering process for forming a processed signal, and then the flow proceeds to step 14. It is noted that the purpose of step 13 is to filter out noises that can not be filtered by the first filtering process of step 11 since the first filtering process is aimed to filter those high-frequency noise and thus certain noise with slightly lower frequency will be missed. Therefore, the second filtering process is performed for reducing the intensity of those noises by oversampling. Please refer to FIG. 3A, which is a flow chart illustrating steps of a second filtering process used in a signal processing method according to a preferred embodiment of the invention. IN FIG. 3A, the second filtering process starts at step 130a. At step 130a, the digital signal is oversampled for acquiring a plurality of sampled signals, and then the flow proceeds to step 131a. At step 131a, the plural sampled signals are averaged or acquiring the processed signal.

Figure 3B:
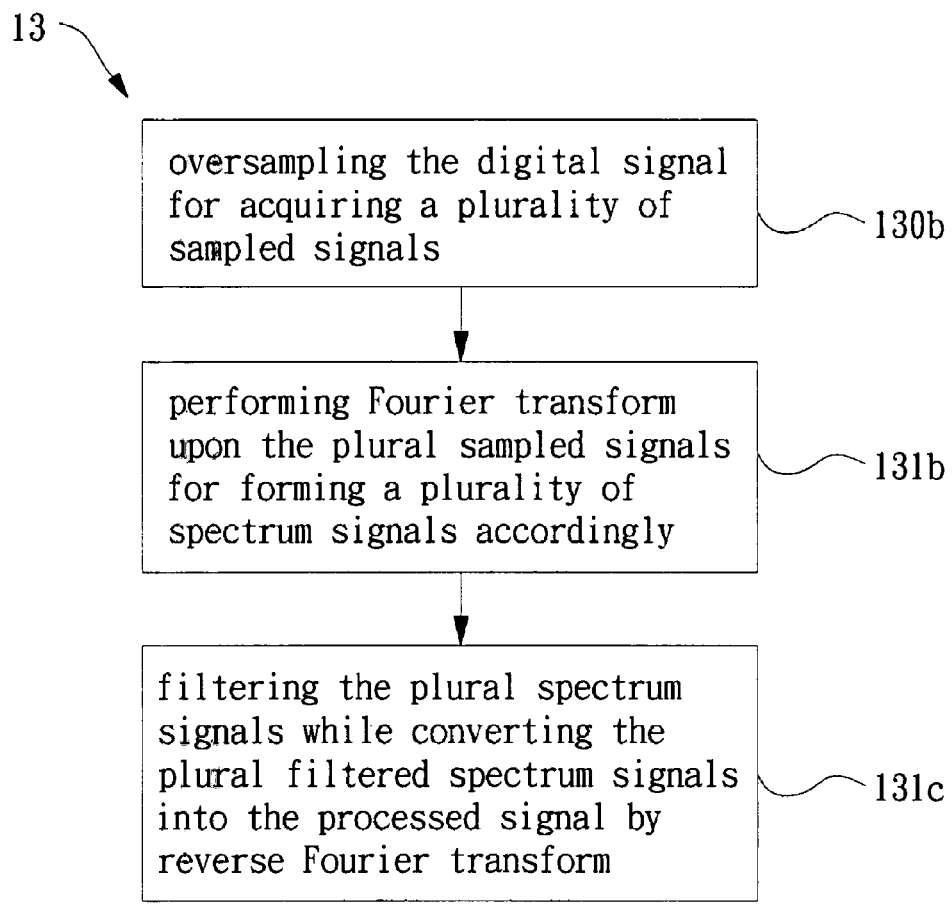
FIG. 3B is a flow chart illustrating steps of a second filtering process used in a signal processing method according to another preferred embodiment of the invention.

In addition, a different second filtering process used in a signal processing method according to another preferred embodiment of the invention is illustrated in FIG. 3B. In FIG.

3B, the second filtering process starts at step 130b. At step 130b, the digital signal is oversampled for acquiring a plurality of sampled signals, and then the flow proceeds to step 131b. At step 131b, Fourier transforms are performed upon the plural sampled signals for forming a plurality of spectrum signals accordingly, and then the flow proceeds to step 131c. At step 131c, the plural spectrum signals are filtered while being converting into the processed signal by reverse Fourier transform.

Back to step 14 of FIG. 1. At step 14, the processed signal is converted into a displacement signal, and then the flow proceeds to step 15. At step 15, the displacement signal is transmitted to an electrical device, whereas the electrical device can be a game console or a computer, etc.

Figure 4A:
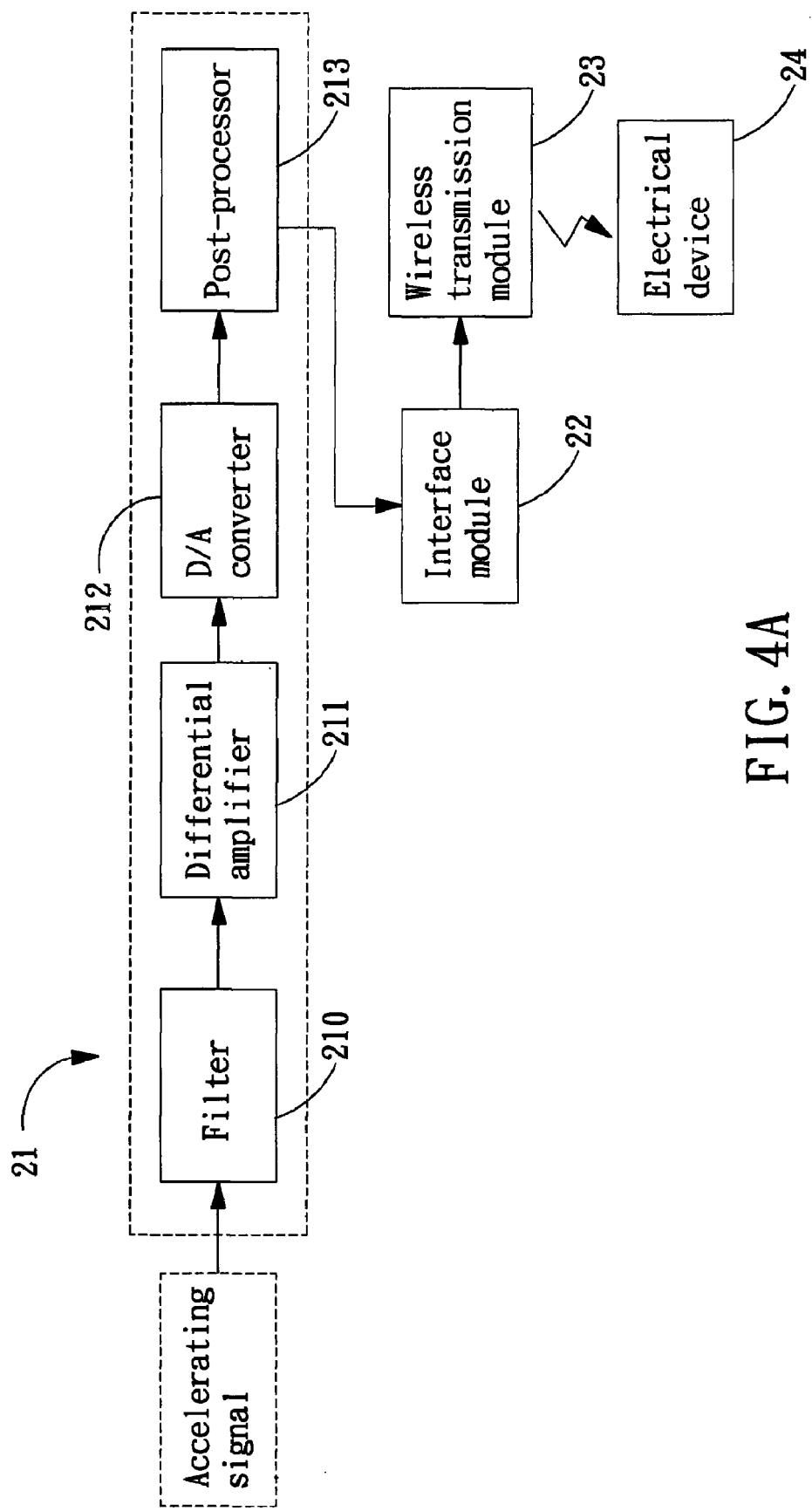
FIG. 4A is a schematic diagram showing a signal processing apparatus according to a preferred embodiment of the invention.

Please refer to FIG. 4A, which is a schematic diagram showing a signal processing apparatus according to a preferred embodiment of the invention. The signal processing apparatus 21 of FIG. 4 comprises a filter 210, a differential amplifier 211, an analog-to-digital converter 212 and a post-processor 213, in which the filter 210 is used to filter noises of the accelerating signal for forming a filtering signal. In this preferred embodiment, the filter is substantially being an analog multi-level active low-pass filter, by which the sampling frequency required and the memory required, comparing to conventional digital filtering performed in those prior-art pointing device, can be reduced as an analog filtering means is adopted thereby, and thus the power consumption of the inertial pointing device is consequently reduced. Therefore, the sluggish feeling of a conventional pointing device caused by the digital filtering of very high sampling frequency can be avoided by the use of analog filtering performed in the signal processing apparatus of the invention. In addition, the massive memory required for storing the enormous amount of coefficients and numerical values generated by conventional digital low-pass filter is no longer needed so that the cost and load of the corresponding inertial pointing device can be reduced. Please refer to FIG. 5, which is a schematic diagram showing differential amplifying signals generated by a signal processing apparatus of the invention. The differential amplifier 211 is used for fetching a specific portion of the filtering signal 90 to form a fetched signal 91 and then amplifying the fetched signal 91 so as to form a differential amplifying signal 92. It is noted that the fetched signal 91 is amplified by 1.65 times in this preferred embodiment, however it is not restricted thereby and thus can be varied with respect to its corresponding hardware. Moreover, the analog-to-digital converter 212 is used for receiving and converting the differential amplifying signal 92 into a digital signal.

Figure 4B:
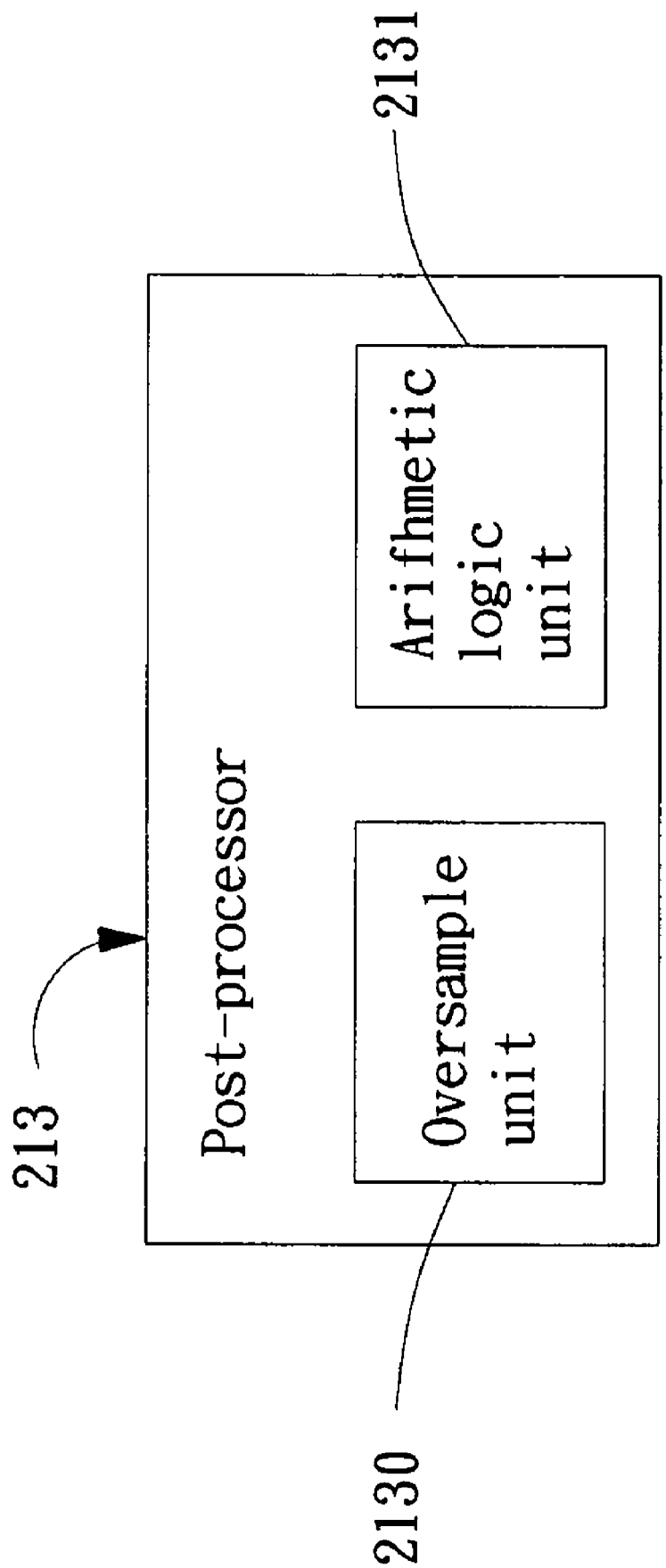
FIG. 4B is a schematic diagram showing a post-processor according to a preferred embodiment of the invention.
Figure 5:
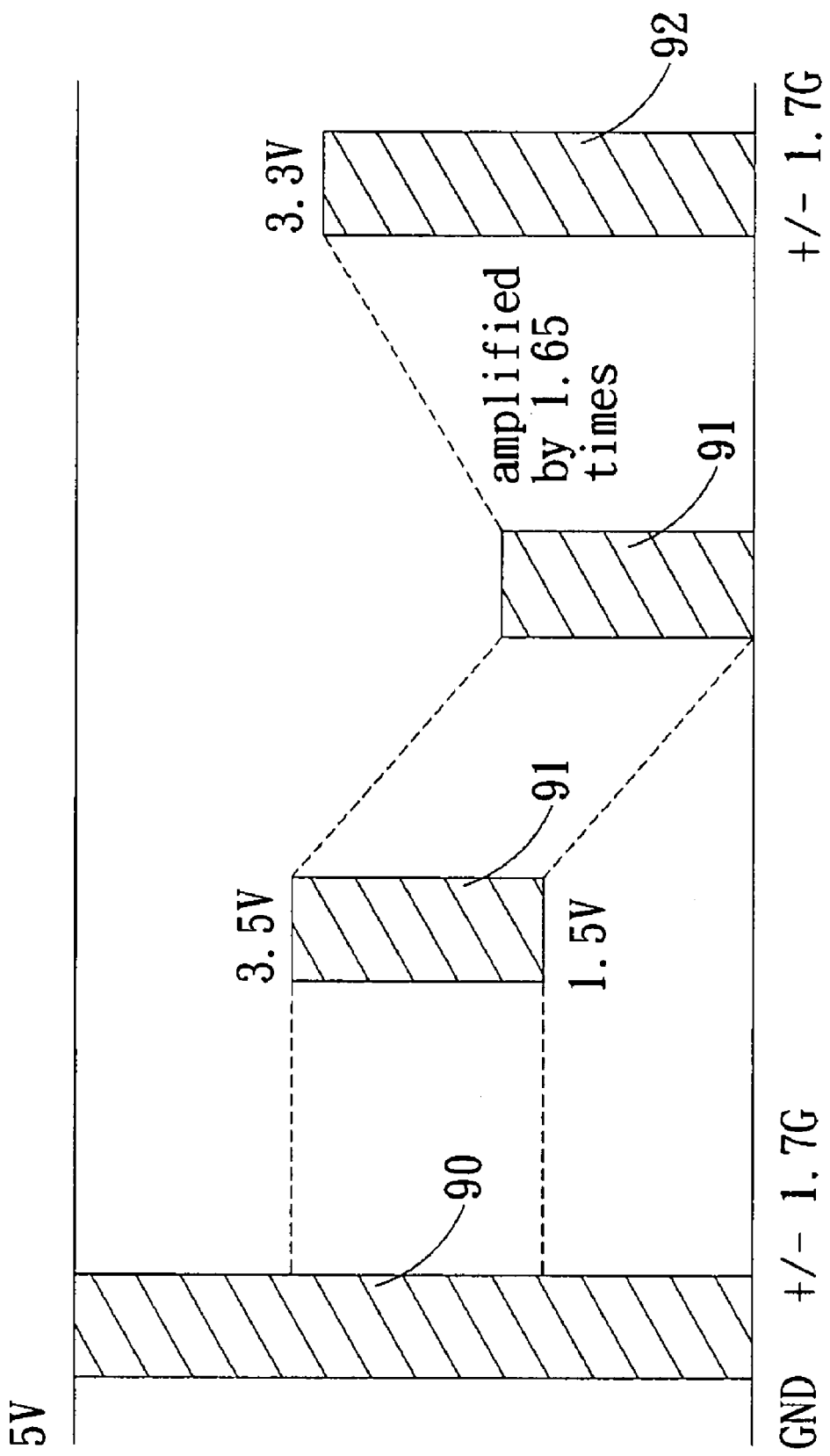
FIG. 5 is a schematic diagram showing differential amplifying signals generated by a signal processing apparatus of the invention.

In addition, the post-processor 213 is coupled to the analog-to-digital converter 212 for enabling the same to receive the digital signal while performing a noise filtering operation upon the digital signal and thus forming a processed signal accordingly. In FIG. 4B, the post-processor 213 is further comprised of an oversample unit 2130 and an arithmetic logic unit 2131. The oversample unit 2130 is used for oversampling the digital signal and thus forming a plurality of sampled signals; and the arithmetic logic unit 2131 is used for receiving and averaging the plural sampled signals so as to form the process signal. As seen in FIG. 4A, the processed signal is transmitted to an electrical device 24 by an interface module 22 and a wireless transmission module 23.

Figure 6A:
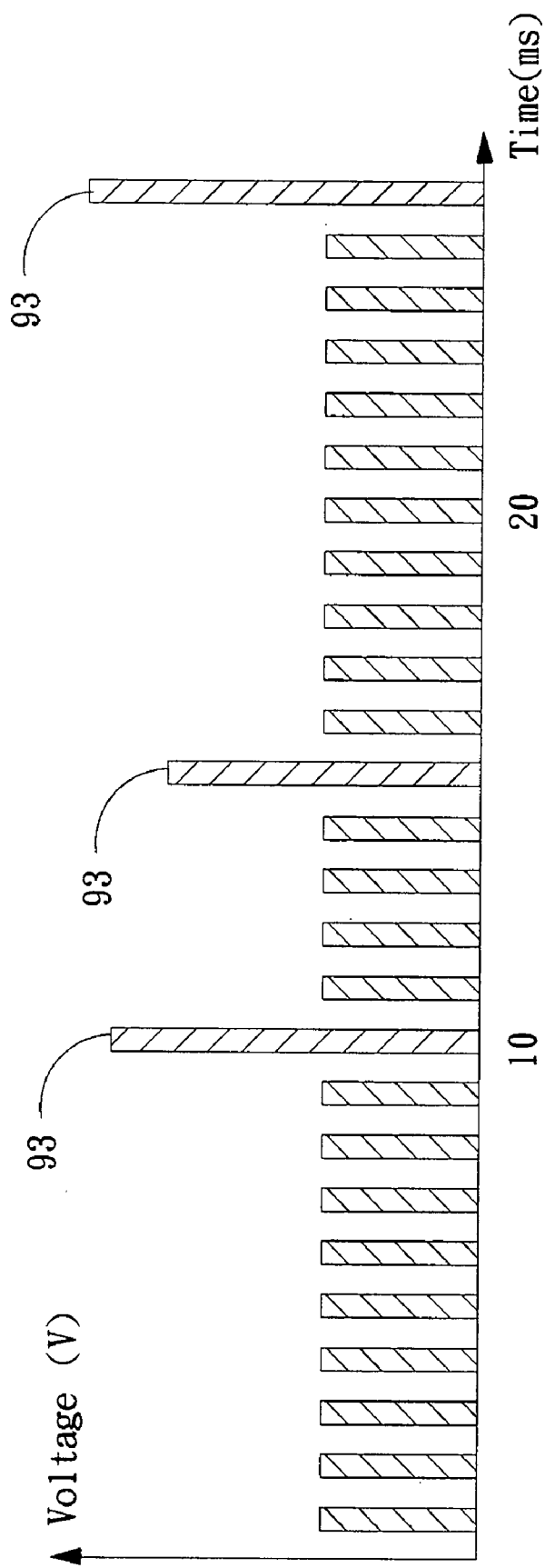
FIG. 6A is a schematic diagram showing signals without oversampling.
Figure 6B:
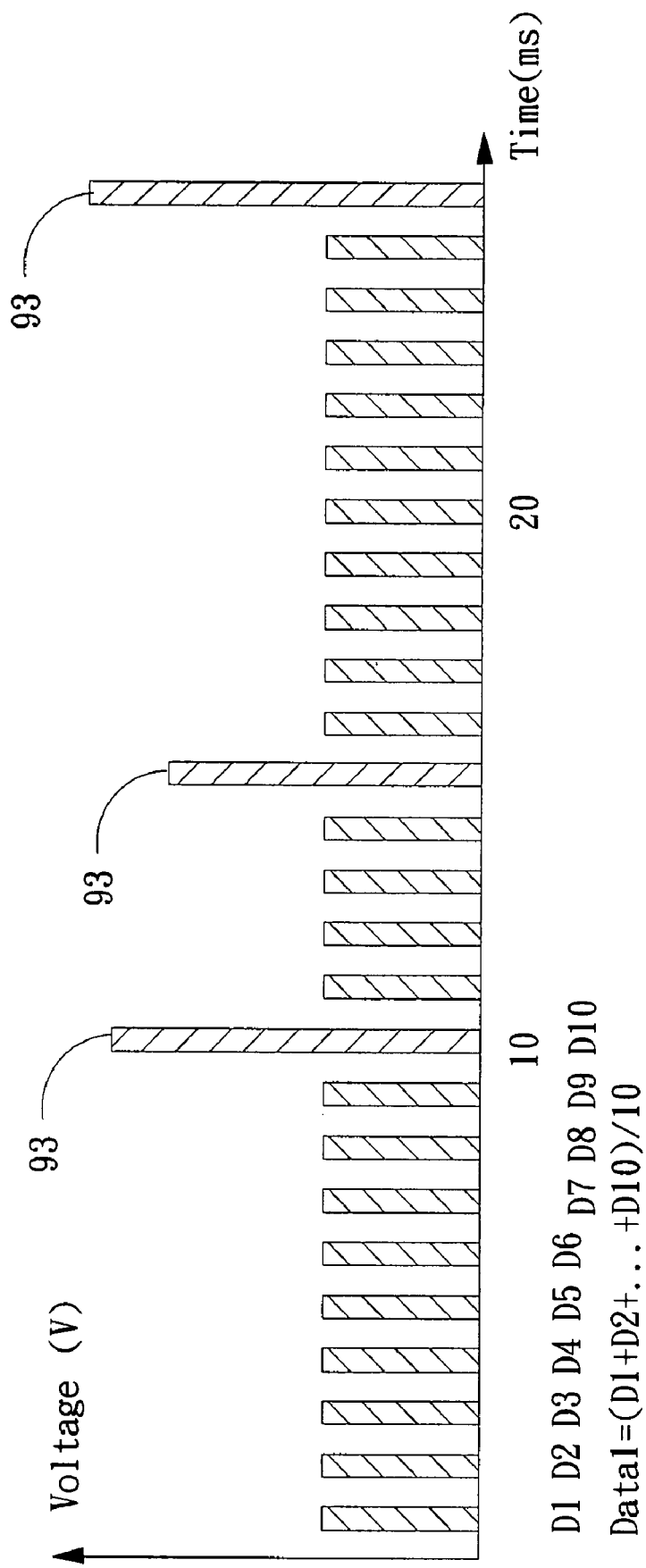
FIG. 6B shows an oversampling by a signal processing apparatus of the invention.

The purpose of the post-processor 213 is to enable a second noise filtering process to be performed upon the digital signal, and thereby the control sensitivity and accuracy of the corresponding pointing device can be enhanced. It is known that although the accelerating signal is being filtered by an multi-level active filter, there are still some high-frequency noises existed in the filtered accelerating signal, but only being attenuated. In FIG. 6A, as the signal is sampled every other 10 ms, some high-frequency noises 93 will be sampled and processed that is going to cause certain misinterpretations. Therefore, it is required to use the post-processor 213 for enabling an second noise filtering of oversampling. As the embodiment shown in FIG. 6B, the signal is sampled every other 1 ms that the signal is sampled 10 times every 10 ms for acquiring 10 sampled signals, D1~D10. Thereafter, the ten sampled signals are averaged for filtering out noises and thus acquiring the processed signal Data1.

In another preferred embodiment, the arithmetic logic unit 2131 of the post-processor 213 is capable of receiving and Fourier-transforming the plural sampled signals for forming a plurality of spectrum signals and then filtering and converting the plural spectrum signals into the processed signal by reverse Fourier transform.

Figure 7:
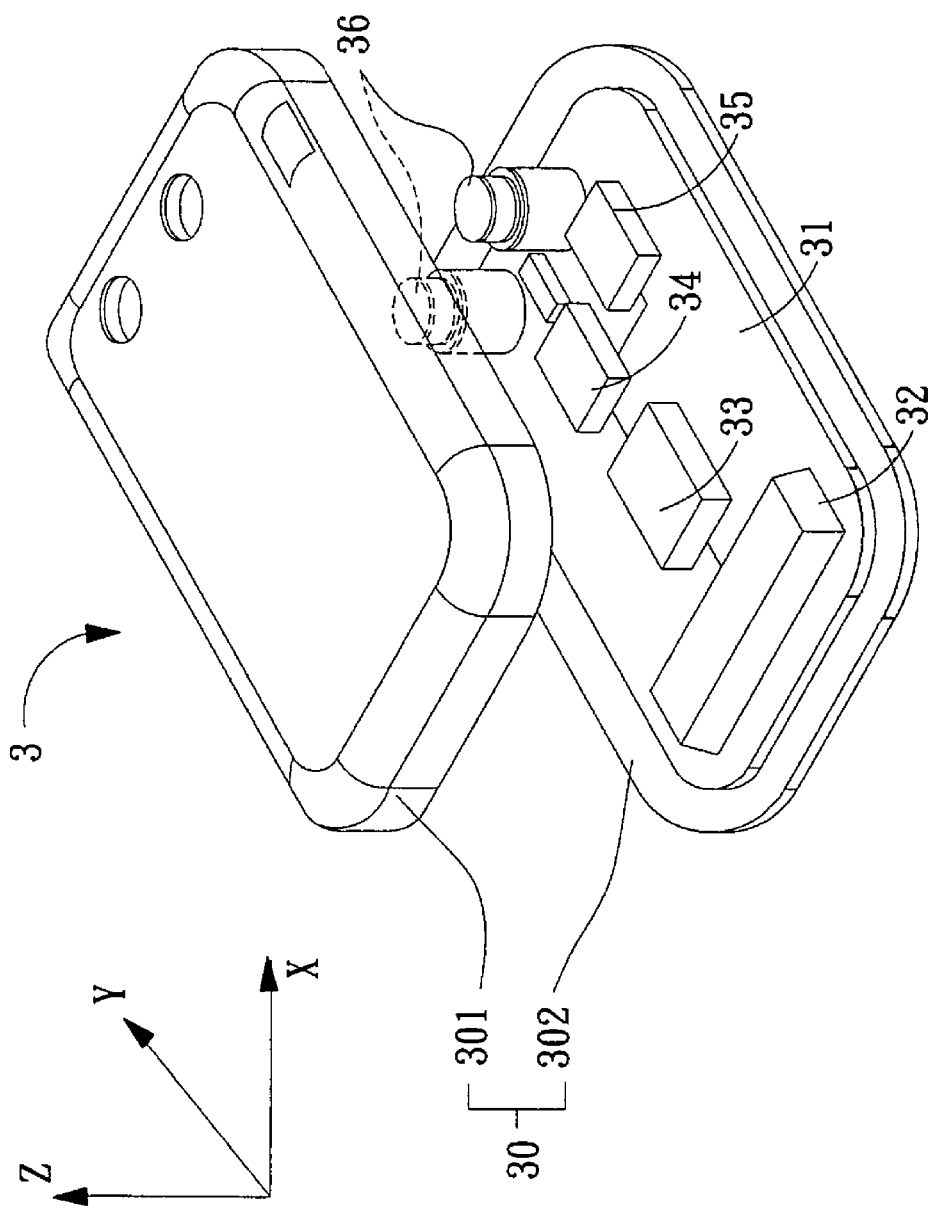
FIG. 7 is a schematic diagram showing an inertial pointing device of the invention.

Please refer to FIG. 7, which is a schematic diagram showing an inertial pointing device of the invention. The inertial pointing device 3 has a hollow housing 30 composed of an upper shell 301 and a lower shell 302. As an accommodation space is formed by the enclosure of the upper shell 301 and the low shell, the accommodation space is capable of receiving necessary circuits and components of the inertial pointing device 3. As seen in FIG. 7, a circuit board 31 is arranged at the lower shell 302 while a front end of the circuit board is configured with press keys to be pressed by an user of the inertial pointing device 3. Moreover, the circuit board is further comprised of an inertial sensing module 32, a signal processing apparatus 33, an interface module 34 and a transmission module 35. The inertial sensing module 32 is capable of sensing a motion of the inertial pointing device 3 and thus generating at least an accelerating signal accordingly, whereas the inertial sensing module 32 can be an accelerometer capable of detecting and measuring an acceleration with respect to at least an axis defined in the inertial pointing device 3. In this preferred embodiment, the inertial sensing module 32 is an accelerometer capable of detecting and measuring accelerations with respect to an X-coordinate and a Y-coordinate. The signal processing apparatus 33 is coupled to the inertial sensing module 32 for enabling the same to process the accelerating signal and thus form a processed signal accordingly. It is noted that the signal processing apparatus is configured as that described above and thus is not described further herein.

The interface module 34 is coupled to the signal processing apparatus 33 for enabling the same to receive and convert the processed signal into a displacement signal. The transmission module 35 is coupled to the interface module 34 for enabling the same to receive and transmit the displacement signal to the electrical device. It is noted that the transmission module 35 can be a wireless transmission module, or can be a wired transmission module capable of transmitting the displacement to the electrical device through a cable connected to an transmission interface thereof, such as an USB interface. If the electrical device is a computer, the displacement signal is utilized by the computer for controlling the movement of a cursor displayed on a display of the computer. If the electrical device is a game console, the displacement signal is utilized by the game console for controlling an object of a game playing on the game console to act or move correspondingly and interactively. As the results of a signal processing method of the invention and a prior-art method shown in the table of FIG. 8, the signal processing method with oversampling technique can produce comparatively more accurate processing results.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A signal processing method, adapted for processing signals generated by a pointing device, comprising steps of:
    acquiring an accelerating signal from the pointing device;
    forming a filtering signal by filtering the accelerating signal with a first filtering process;
    converting the filtering signal into a digital signal; and
    processing the digital signal with a second filtering process to form a processed signal;
    wherein the second filtering process further comprises the steps of:
    oversampling the digital signal for acquiring a plurality of sampled signals;
    performing Fourier transform upon the plural sampled signals for forming a plurality of spectrum signals accordingly; and
    filtering the plural spectrum signals while converting the plural filtered spectrum signals into the processed signal by reverse Fourier transform.

2. The signal processing method of claim 1, wherein the second filtering process further comprises steps of:
    averaging the plural sampled signals for acquiring the processed signal.

3. The signal processing method of claim 1, further comprising steps of:
    converting the processed signal into a displacement signal; and
    transmitting the displacement signal to an electrical device.

4. The signal processing method of claim 3, wherein the electrical device is a device selected from the group consisting of a game console and a computer.

5. The signal processing method of claim 1, wherein the converting of the filtering signal further comprises steps of:
    fetching and amplifying a specific portion of the filtering signal for forming a differential amplifying signal; and
    performing a digital conversion upon the differential amplifying signal for forming the digital signal.

6. A signal processing apparatus, for receiving and processing an accelerating signal from an inertial sensing module, comprising:
    a filter, for performing a first noise filtering process upon the received accelerating signal so as to form a filtering signal;
    an analog-to-digital converter, coupled to the filter for enabling the same to receive and convert the filtering signal into a digital signal; and
    a post-processor, coupled to the analog-to-digital converter for enabling the same to receive and perform a second noise filtering process upon the digital signal so as to form a processed signal;
    wherein the post-processor further comprises:
    an oversample unit, capable of oversampling the digital signal so as to form a plurality of sampled signals; and
    an arithmetic logic unit, capable of receiving and Fourier-transforming the plural sampled signals for forming a plurality of spectrum signals and then filtering and converting the plural spectrum signals into the processed final by reverse Fourier transform.

7. The signal processing apparatus of claim 6, wherein the filter is a multi-level active low-pass filter.

8. The signal processing apparatus of claim 6, wherein the arithmetic logic unit further comprises:
    functionality including receiving and averaging the plural sampled signals for forming the processed signal accordingly.

9. The signal processing apparatus of claim 6, further comprising:
    a differential amplifier, coupled to the filter and the analog-to-digital converter.

10. An inertial pointing device, comprising:
    an inertial sensing module, capable of sensing a motion of the inertial pointing device and thus generating at least an accelerating signal accordingly;
    a signal processing apparatus, coupled to the inertial sensing module;
    an interface module, coupled to the signal processing apparatus for enabling the same to receive and convert the processed signal into a displacement signal; and
    a transmission module, coupled to the interface module for enabling the same to receive and transmit the displacement signal to an electrical device;
    wherein the signal processing apparatus further comprises:
    a filter, for filtering the at least one accelerating signal so as to form a filtering signal;
    an analog-to-digital converter, coupled to the filter for enabling the same to receive and convert the filtering signal into a digital signal; and
    a post-processor, coupled to the analog-to-digital converter for enabling the same to receive and perform a noise filtering process upon the digital signal so as to form a processed signal;
    wherein the post-processor further comprises:
    an oversample unit, capable of oversampling the digital signal so as to form a plurality of sampled signals; and
    an arithmetic logic unit, capable of receiving and Fourier-transforming the plural sampled signals for forming a plurality of spectrum signals and then filtering and converting the plural spectrum signals into the processed signal by reverse Fourier transform.

11. The inertial pointing device of claim 10, wherein the filter is a multi-level active low-pass filter.

12. The inertial pointing device of claim 10, wherein the arithmetic logic unit further comprises:
    functionality including receiving and averaging the plural sampled signals for forming the processed signal accordingly.

13. The inertial pointing device of claim 10, further comprising:
    a differential amplifier, coupled to the filter and the analog-to-digital converter.

14. The inertial pointing device of claim 10, wherein the inertial sensing module further comprises at least an accelerometer.

15. The inertial pointing device of claim 10, wherein the inertial sensing module further comprises at least a gyroscope.

16. The inertial pointing device of claim 10, wherein the transmission module is a component selected from the group consisting of a wired transmission module and a wireless transmission module.

17. The inertial pointing device of claim 10, wherein the electrical device is a device selected from the group consisting of a game console and a computer.

* * * * *